(12) United States Patent
Chen et al.

(10) Patent No.: US 7,314,060 B2
(45) Date of Patent: Jan. 1, 2008

(54) FLUID FLOW CONDUCTING MODULE

(75) Inventors: Jyh-Jain Chen, Kao-Hsiung (TW); Jhy-Wen Wu, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 412 days.

(21) Appl. No.: 11/112,467

(22) Filed: Apr. 23, 2005

(65) Prior Publication Data

US 2006/0237069 A1   Oct. 26, 2006

(51) Int. Cl.
   *B01F 5/00* (2006.01)
(52) U.S. Cl. .............. 137/597; 137/599.03; 366/181.5; 366/337; 366/338; 366/DIG. 1
(58) Field of Classification Search ...... 366/DIG. 1–4, 366/181.5, 366–341; 137/597, 599.03, 896
   See application file for complete search history.

(56) References Cited

U.S. PATENT DOCUMENTS

| | | | | |
|---|---|---|---|---|
| 5,716,852 A | * | 2/1998 | Yager et al. | 436/172 |
| 5,921,678 A | * | 7/1999 | Desai et al. | 366/336 |
| 5,932,100 A | * | 8/1999 | Yager et al. | 210/634 |
| 5,955,029 A | * | 9/1999 | Wilding et al. | 422/68.1 |
| 6,073,482 A | | 6/2000 | Moles | 73/53.01 |
| 6,241,379 B1 | * | 6/2001 | Larsen | 366/181.5 |
| 6,457,854 B1 | * | 10/2002 | Koop et al. | 366/336 |
| 6,695,147 B1 | | 2/2004 | Yager et al. | 209/455 |
| 6,907,895 B2 | * | 6/2005 | Johnson et al. | 137/1 |
| 7,135,144 B2 | * | 11/2006 | Christel et al. | 422/99 |

OTHER PUBLICATIONS

A Microfabricated Array Bioreactor For Perfused 3D Liver Culture Mark J. Powers, Karel Domansky, Mohammad R. Kaazempur-Mofrad, Artemis Kalezi . . . 2002 Wiley Periodicals, Inc. p. 257~p. 269
Micromachined pre-focused 1×N flow switches for continuous sample injection Gwo-Bin Lee, Chen-I Hung, Bin-Jo Ke, Guan-Ruey Huang and Bao-Herng Hwei 2001 IOP Publishing Ltd. p. 567~p. 573.

* cited by examiner

*Primary Examiner*—David Sorkin

(57) ABSTRACT

Disclosed is a fluid flow conducting module comprising two or more inlets, one or more outlets, and a chamber that has a first and second blocks therein. Further, the chamber has a gradually wider section in the middle, and two convergent ends. One convergent end is connected to the inlets, and the other convergent end is connected to the outlets. The first block has an acute angle in the front, and is placed close to the first convergent end and the inlets. The second block has a convex surface in the front, and is placed close to the second convergent end. The fluids are injected into the chamber through the inlets, flow through the chamber, and conducted towards one or more outlets for further collection and analysis. This fluid flow conducting module has a wide range of flow speed and a simple structure. It can be used in a wide range of applications, such as cell culture, cell reaction to medicine or bio-chemical detection.

9 Claims, 4 Drawing Sheets

FLUID FLOW CONDUCTING MODULE

FIELD OF THE INVENTION

The present invention generally relates to a microfluidic device, and more specifically to a fluid flow conducting module with a specially designed chamber for conducting the flows of different microfluids entering the chamber.

BACKGROUND OF THE INVENTION

Microfluidic technologies are widely used in bio-chemical analysis, such as micro-pump, micro-valve, micro-filter, micro-mixer, micro-channel, and micro-sensor. They are mostly used in micro-chips for processes such as sample pre-processing, mixing, transmission, separation, and detection. The use of micro-fluidic chips in biological or medical diagnosis and analysis has the advantages of saving both time and manpower.

U.S. Pat. No. 6,073,482 disclosed a fluid flow module having a micro-channel with a sensor. By opening and closing the valves, the module conducts three types of fluids (i.e. calibrant, buffer, and analyte) into the micro-channel. It allows for analyte sample flow therethrough while providing a site for the location of a sensing elements or elements therein to detect analyte presence and/or concentration. The disclosed module can be used as a micro bio-chemical diagnosis kit.

Similarly, U.S. Pat. No. 6,695,147 disclosed an absorption-enhanced differential extraction device. As shown in FIG. 1, the H-shaped micro-channel structure 100 of the device can be used to extract or separate from a solution.

Lee et. al. (Micromachined Pre-focused 1×N Flow Switches for Continuous Sample Injection, J. Micromech. Microeng., 11(2001), pp. 567-573) disclosed a micro-channel structure using the fluid-dynamic from a micro-pump to inject various samples into various outlets for connecting to different fluidic analysis chip.

Powers et. al. (A Microfabricated Array Bioreactor for Perfused 3D Liver Culture, Biotechnology and Bioengineering, 78(2002), pp. 257-269) disclosed a 3D micro-structure using continuous cyclic flow to cultivate the liver cells from a mouse and observe the changes.

SUMMARY OF THE INVENTION

The primary object of the present invention is to disclose a fluid flow conducting module that provides a stable function for dynamically conducting the flow of different microfluids entering a chamber.

Thereby, one feature of the fluid flow conducting module is that the flows of plural fluids are approximately parallel to each other when the fluids inside the chamber are in the laminate-layer flow state.

Another feature of the fluid flow conducting module is that it conducts a specific fluid to one or more specific outlets of the module by adjusting the flow speed ratio between different fluids.

Yet another feature of the fluid flow conducting module is that it allows dynamic adjustment of the amount of the time the fluids take to flow through the module by adjusting the flow speed of the fluids.

Yet another feature of the fluid flow conducting module is that it has a wide range of flow speeds, while keeps simple in structure so that the manufacturing cost would be low for a wide range of applications in cell culture, cell reaction test, or bio-chemical diagnosis.

To facilitate the aforementioned features and achieve the primary object, the fluid flow conducting module of the present invention comprises at least two inlets, a plurality of outlets, and a chamber that has a first and second blocks therein. The chamber has a gradually wider section in the middle, and a first and second convergent ends. The first convergent end is connected to the inlets. The second convergent end is connected to the outlets. The two convergent ends have rounded edges. The first block inside the chamber has an acute angle in the front, and is placed close to the convergent point of the first convergent end. The second block inside the chamber has a convex surface in the front, and is placed close to the convergent point of the second convergent end.

With the specially designed chamber and the two blocks therein, it may avoid flow separation, reduce the entry length of a fully developed flow, and avoid the distortion for a flow path, thereby reducing the transfer portions that the flow lines become straight lines. The fluid speed at outlets will not be affected by the fluid parameters at inlets because the fluids are fully developed. The specially designed chamber also allows collecting same amount of fluid at each outlet, by setting proper locations for the outlet channels and providing proper widths for the outlets.

The guiding process for the above fluid flow conducting module includes (a) using two or more fluid inlets to conduct one or more fluids being injected into a chamber having a first and second blocks therein, wherein the first block has an acute angle in the front, and is placed close to the convergent point of the first convergent end; and the second block has a convex surface in the front, and is placed close to the convergent point of the second convergent end; (b) adopting a structure for the chamber with a gradually wider section in the middle, and arranging a first and second convergent ends for the chamber, wherein the first convergent end is connected to the inlets, the second convergent end is connected to the outlets, and the two convergent ends have rounded edges; (c) adjusting the coverage areas traveled by the fluids, through the use of changing the injected speed of the fluids; and (d) setting one or more specific outlets at the end of the chamber and conducting the fluids towards the one or more outlets for further collecting the fluids.

According to the invention, the two convergent ends of the chamber are gradually converged with a rounded edge so that the chamber is wide in the middle section and narrow at both ends towards the inlets and the outlets. The fluids are injected into the chamber through the fluid inlets, flowing through the chamber, and conducted towards one or more outlets for further collection and analysis.

The foregoing and other objects, features, aspects and advantages of the present invention will become better understood from a careful reading of a detailed description provided herein below with appropriate reference to the accompanying drawings.

DETAILED DESCRIPTION OF THE PREFERRED EMBODIMENTS

Figure 1:
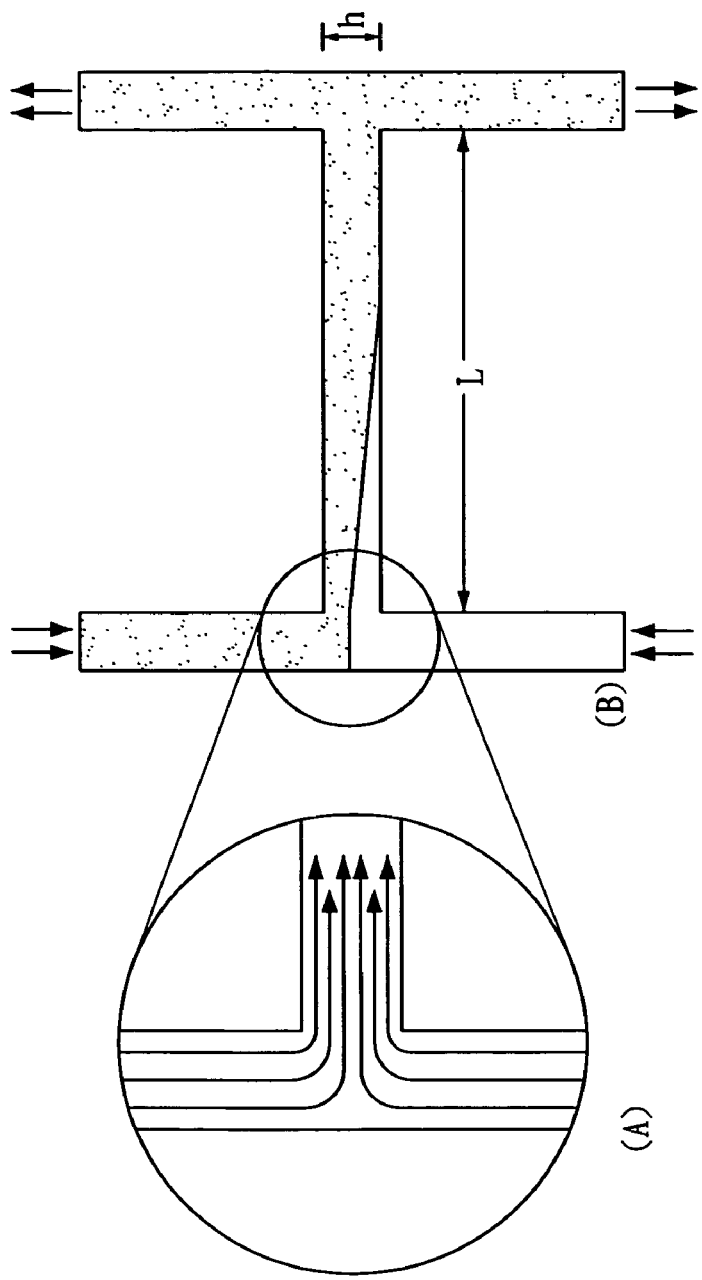
FIG. 1 shows a conventional absorption-enhanced differential extraction device with an H-shaped micro-channel structure.
Figure 2:
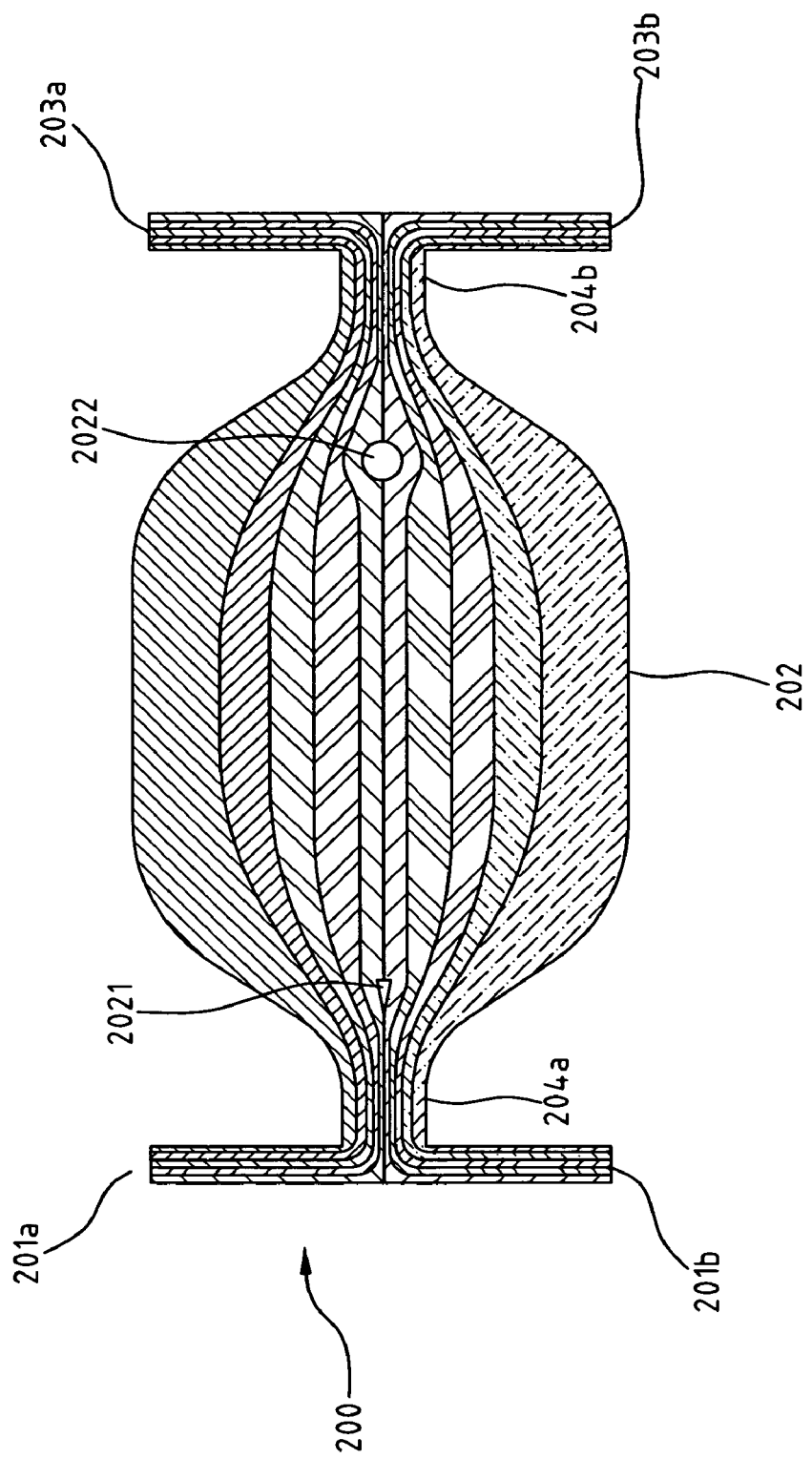
FIG. 2 shows a schematic view of the fluid flow conducting module according to a preferred embodiment of the present invention.
Figure 3A:
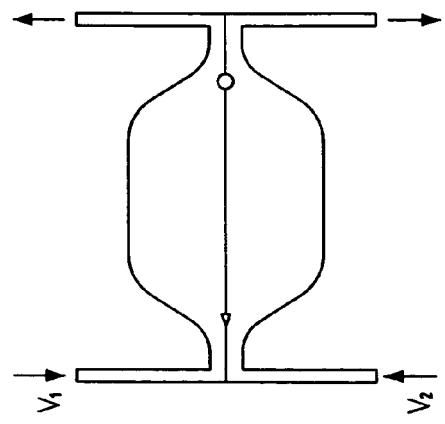
FIGS. 3a-3e show schematic views of the flow pattern with various injection speeds of the fluids.
Figure 3B:
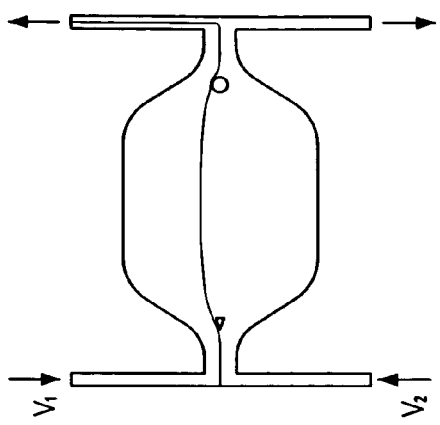
Figure 3C:
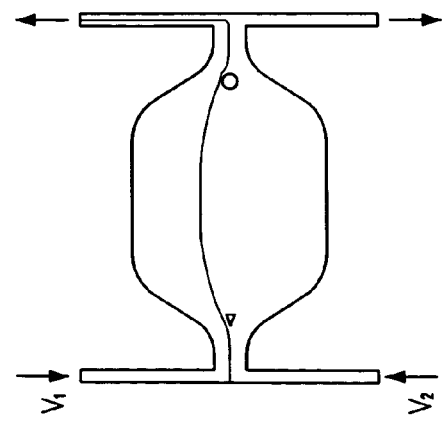
Figure 3D:
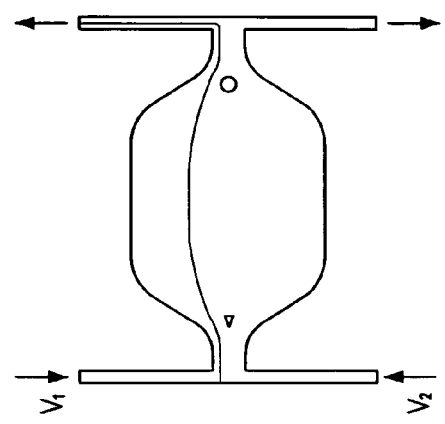
Figure 3E:
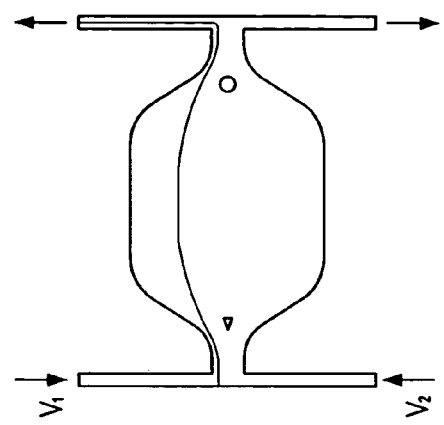

FIG. 2 shows a schematic view of the fluid flow conducting module according to a preferred embodiment of the present invention. Referring to FIG. 2, a fluid flow conducting module 200 comprises two inlets 201a and 201b, two outlets 203a and 203b and a chamber 202. The chamber 202 has a gradually wider section in the middle and a first and second convergent ends 204a and 204b. In addition, the chamber 202 has a first block 2021 and a second block 2022 therein. The middle points where chamber 202 starts to converge towards the convergent ends are defined as the convergent points. The first convergent end 204a is connected to the inlets 201a and 201b, and the second convergent end 204b is connected to the outlets 203a and 203b. In FIG. 2, only two inlets and two outlets are shown, while the number of inlets and outlets may vary in accordance with the application needs.

As shown in FIG. 2, the first block 2021 has an acute angle in the front, and is placed at the converging point with the acute angle toward the connection point of the first convergent end and the inlets. The second block 2022 has a convex surface in the front and towards the first block 2021, and is placed at the convergent point of laminate-layer flow towards the outlets. With the first and second blocks, the flows of plural fluids are approximately parallel to each other when the fluids inside the chamber are in the laminate-layer flow state. The dashed line in FIG. 2 shows the flow pattern of the fluids. By the strategically placed block 2021 and block 2022, the fluids from inlets 201a and 201b are conducted through chamber 202 in a fashion of laminate layer flow. It is worth noticing that the dashed lines are parallel in the gradually wider section in the middle of chamber 202.

With the gradually wider section in the middle of the chamber and the two blocks therein, when the fluids enter the chamber, it may avoid flow separation, reduce the entry length of a fully developed flow, and avoid the distortion for a flow path. Thereby, the transfer portions that the flow lines become straight lines are reduced.

After the fluids have entered the chamber, the fluid speed at outlets will not be affected by the fluid parameters at inlets because the fluids are fully developed. The specially designed chamber also allows collecting same amount of fluid at each outlet. This can be achieved by setting a proper location for each outlet channel and providing a proper width for the corresponding outlet.

In accordance with the invention, chamber 202 may be a symmetric chamber with which the flow paths of plural fluids are substantially parallel and approximately become lines when the fluids are in the laminate-layer flow state. The front of block 2021 may be better in the shape of an acute symmetric triangle to conduct the fluids.

The guiding principle of the fluid flow conducting module of the invention is described as follows. The fluid flow conducting module uses two or more fluid inlets to conduct the fluids being injected into a chamber having a gradually wider section in the middle. Through the special structure of the chamber, the flows of the fluids are approximately parallel to each other when the fluids inside the chamber are in the laminate-layer flow state, and the fluids will not mix up during the flow. When the fluids from the fluid inlets are injected in at an identical speed, the fluids will travel an equal coverage volume after entering the chamber. On the other hand, when the fluids from the fluid inlets are injected in at different speeds, the fluids from different fluid inlets will travel variable coverage areas after entering the chamber. The variable coverage areas are in proportion to their injection speeds of these fluids. By setting one or more specific outlets at the end of the chamber, the fluids belonging to a same kind can be conducted to one or more specific outlets for further collecting the fluids.

In summary, the guiding process of the fluid flow conducting module can be described as follows. (a) First, it uses two or more fluid inlets to conduct one or more fluids being injected into a chamber. (b) Secondly, it adopts a chamber that has a first and a second blocks therein, and a gradually wider section in the middle, wherein the first block has an acute angle in the front, and the second block has a convex surface in the front. Accordingly, the fluidic flows are approximately parallel each other when the fluids inside the chamber are in the laminate-layer flow state. It also arranges a first and second convergent ends for the chamber. The first convergent end is connected to the inlets, and the second convergent end is connected to the outlets. The two convergent ends have rounded edges. (c) Then, it adjusts the coverage areas traveled by the fluids, through the use of changing the injected speed of the fluids. (d) Finally, it sets one or more specific outlets at the end of the chamber and conducting the fluids towards the one or more outlets for further collecting the fluids.

In addition, step (b) may further include a step of placing the first block close to the convergent point of the first convergent end, and the acute angle towards the connection point of the first convergent end and the inlets.

Similarly, step (d) may further include a step of placing the second block close to the convergent point of the second convergent end, and the convex surface towards the first block.

The capability of fluid flow conducting module of the present invention is related to the density, viscosity, injection speed of the fluids, as well as to the diameter of the micro-channel, the width of the convergent section, and the size and the shape of the chamber. Therefore, these factors can be used as the control parameters of the fluid flow conducting module of the invention.

FIGS. 3a-3e show that various flow patterns of the fluids can be formed when the relative injection speeds of the fluids into the inlets varies. In FIGS. 3a-3e, two inlets, a top inlet and a bottom inlet are taken as an example, wherein $v_1$ and $v_2$ represent the relative injection speeds of the fluids at the top and bottom inlets, respectively. Further, the ratios between $v_1$ and $v_2$ shown in FIGS. 3a-3e are 1:1, 1:2, 1:3, 1:4, and 1:5, respectively.

As shown in FIGS. 3a-3e, the dashed line curved up as the fluids at the bottom inlet is injected in at a higher speed than that of the top inlet; the fluid from the bottom covers a greater area in the chamber throughout the flow. It is also worth noticing that the fluids are also proportionally conducted towards different outlets. As shown, the fluid from the bottom inlet is conducted towards the entire bottom outlet as well as a part of the top outlet. Therefore, by adjusting the relative injection speed of the fluids at the inlets, the present invention can conduct the fluids to flow different areas of the chamber, towards different outlets for collection and analysis. As described earlier, the lower the speed of the fluid, the smaller the area the fluid covers.

As mentioned earlier, one of the advantages of the present invention is to reduce the entry length of a fully developed flow. Thereby, the ratio between the cross sectional width of the chamber and the areas covered by the different fluids keeps a special relationship with the injection speed of the different fluids.

Figure 4:
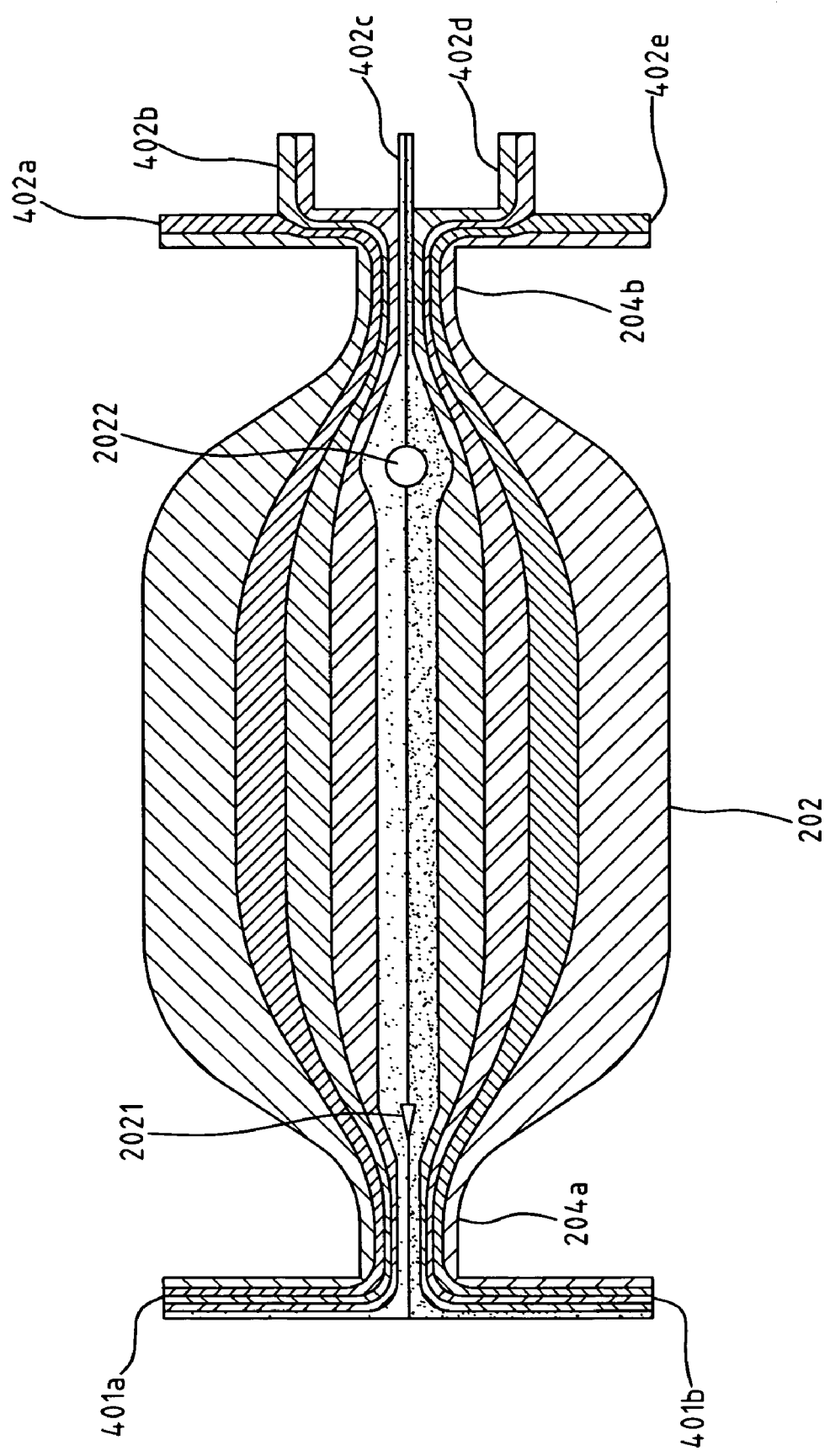
FIG. 4 shows an example of FIG. 2 according to the present invention.

FIG. 4 shows an application example of the present invention having two inlets 401a-401b, a chamber 202, and five outlets 402a-402e, wherein the chamber 202 has a triangular-shaped block 2021 and a circle-shaped block 2022 therein. As in FIGS. 3a-3e, by varying the injection speed at the inlets, the fluids in FIG. 4 can be conducted towards different outlets. With this design, a fluid can be conducted towards a plurality of outlets, or different fluids can be conducted towards a same outlet. For different applications, the number of inlets and outlets can be changed and the relative injection speed can be varied so that a variety of diagnosis and detections can be performed, such as the presence of a material, concentration of a material, and so on.

In comparison to the conventional techniques, the fluid flow conducting module provides the following advantages. (1) The flow lines of plural fluids are close to parallel when the fluids are in the laminate-layer flow state. (2) It is able to conduct a specific fluid to one or more specific outlets of the module by adjusting the flow speed ratio between different fluids. (3) It allows dynamic adjustment of the amount of the time that the fluids flow through the module, by adjusting the flow speed of the fluids. (4) It has a wide range of flow speeds, while keeps simple in structure so that the manufacturing cost would be low for a wide range of applications, such as in cell culture, cell reaction test, or bio-chemical diagnosis.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A fluid flow conducting module, comprising:
at least two inlets;
one or more outlets;
a chamber having a gradually wider section in the middle, and a first and second convergent ends, said first end being connected to said inlets, said second end being connected to said outlets, said convergent ends having rounded edges, the middle point where said chamber starting to converge towards said convergent ends being defined as convergent points;
a first block inside said chamber, having an acute angle in the front and being placed at said convergent point of said first convergent end; and
a second block inside said chamber, having a convex surface in the front and being placed at said convergent point of said second convergent end;
wherein said fluids are injected from said inlets, flow through said chamber, and are collected at said outlets.

2. The fluid flow conducting module as claimed in claim 1, wherein the flow pattern of said fluids in said chamber is in a form of parallel straight lines.

3. The fluid flow conducting module as claimed in claim 1, wherein different flow patterns are obtained by varying the types of said fluids and the relative injection speeds of said fluids.

4. The fluid flow conducting module as claimed in claim 1, wherein the higher speed at which said fluid is injected, the more chamber area said fluid flow covers.

5. The fluid flow conducting module as claimed in claim 1, wherein said fluid are conducted towards and collected at one or more outlets.

6. The fluid flow conducting module as claimed in claim 1, wherein said fluid flow conducting module is applicable in cell culture, cell reaction test, or bio-chemical diagnosis.

7. The fluid flow conducting module as claimed in claim 1, wherein said chamber is a symmetric chamber.

8. The fluid flow conducting module as claimed in claim 1, wherein said first block is in the shape of an acute triangle and said second block is in the shape of a circle.

9. The fluid flow conducting module as claimed in claim 1, wherein the density, viscosity, injection speed of said fluids, as well as the width of said converging section, and the size and the shape of said chamber are used as the control parameters of said fluid flow conducting module.

* * * * *